United States Patent
Iwanami et al.

(10) Patent No.: US 6,927,500 B2
(45) Date of Patent: Aug. 9, 2005

(54) AUTOMOTIVE ACCESSORIES CONTROL SYSTEM

(75) Inventors: Shigeki Iwanami, Okazaki (JP); Kazuhide Uchida, Hamamatsu (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 0 days.

(21) Appl. No.: 10/792,733

(22) Filed: Mar. 5, 2004

(65) Prior Publication Data

US 2004/0178636 A1 Sep. 16, 2004

(30) Foreign Application Priority Data

Mar. 10, 2003 (JP) .................................... 2003-063399

(51) Int. Cl.[7] .................................................. H02P 9/04
(52) U.S. Cl. ................. 290/40 C; 290/40 A; 290/40 B; 322/10; 322/12
(58) Field of Search ............................. 322/10, 28, 16, 322/12; 290/40 A, 40 B, 40 C

(56) References Cited

U.S. PATENT DOCUMENTS

| | | | |
|---|---|---|---|
| 3,992,885 A | * | 11/1976 | Forster ........................ 60/698 |
| 5,724,941 A | * | 3/1998 | Suzuki et al. .......... 123/339.15 |
| 6,048,288 A | * | 4/2000 | Tsujii et al. .................... 477/5 |
| 6,294,843 B1 | * | 9/2001 | Kato et al. ................. 290/40 C |
| 6,443,712 B2 | * | 9/2002 | Sakai et al. ................. 417/374 |
| 6,559,551 B2 | * | 5/2003 | Graage et al. ............ 290/40 B |
| 6,662,580 B2 | * | 12/2003 | Suitou et al. ............... 62/228.1 |
| 6,672,267 B2 | * | 1/2004 | Souki et al. ............. 123/179.3 |
| 2002/0056993 A1 | * | 5/2002 | Kennedy ..................... 290/1 A |
| 2004/0090211 A1 | * | 5/2004 | Gupta et al. .................. 322/10 |
| 2004/0149245 A1 | * | 8/2004 | Moriya ..................... 123/179.4 |

FOREIGN PATENT DOCUMENTS

JP     A-H11-287182     10/1999

* cited by examiner

Primary Examiner—Darren Schuberg
Assistant Examiner—Heba Elkassabgi
(74) Attorney, Agent, or Firm—Posz Law Group, PLC

(57) ABSTRACT

Power generated by an alternator 2 and power generated by an electric motor 12 are controlled such that a power generation amount of either the alternator 2 or the electric motor 12, whichever has a higher power generation efficiency, becomes larger than a power generation amount of either the alternator 2 or the electric motor 12, whichever has a lower power generation efficiency. Consequently, power needed for power generation, that is, power consumed by an engine 1 can be decreased, thereby making it possible to improve the fuel economy of a vehicle.

12 Claims, 4 Drawing Sheets

AUTOMOTIVE ACCESSORIES CONTROL SYSTEM

BACKGROUND OF THE INVENTION

1. Technical Field of the Invention

The present invention relates to an accessories control system for a vehicle having a compressor, which is adapted to obtain power from one of a driving source for running the vehicle and a rotating electric device for drawing and compressing a refrigerant. The vehicle also includes a generator adapted to obtain power from the driving source so as to generate electricity. The accessories control system is effective when used on an ordinary passenger vehicle.

2. Description of the Related Art

Conventionally, in order to make an air conditioner (a vapor compression type refrigerating apparatus) continue to operate without stopping even if an engine for running the vehicle is stopped, a so-called hybrid compressor has been employed, which is adapted to operate by obtaining power from at least either the engine or an electric motor (refer to, for example, Japanese Unexamined Patent Publication No. 11-287182).

Incidentally, in an invention disclosed in the patent literature, while there is a description that electricity is generated by an electric motor of a hybrid compressor, no description is given as to a specific means for improving the fuel economy of a vehicle by making effective use of electric power generated by the electric motor of the hybrid compressor.

SUMMARY OF THE INVENTION

In view of the aforesaid situations, a first object of the present invention is to provide a power source system for an automotive accessories control system which is different from conventional power source systems and is novel, and a second object thereof is to provide a construction for improving the fuel economy of a vehicle having an existing generator of a type that is conventionally installed in an automobile and a rotating electric device for driving a compressor and a control thereof.

With a view to attaining the objects, according to an aspect of the invention, there is provided an automotive accessories control system for an automotive vehicle having a compressor (11), adapted to obtain power from at least either of a driving source (1) for running and a rotating electric device (12) so as to suck in and compress a refrigerant, and a generator (2), adapted to obtain power from the driving source (1) so as to generate electricity, the automotive accessories control system comprising a compressor control means (6) for controlling the power supplied to the compressor (11) from at least the driving source (1) or the rotating electric device (12) and an electric power generation control means (7, 8) for controlling a power generated by the generator (2) and a power generated by the rotating electric device (12) when electricity is generated by driving the rotating electric device (12) by the driving source (1), wherein the electric power generation control means (7, 8) controls power generated by the generator (2) and the rotating electric device (12) based on the power generation efficiency of the generator (2) and the power generation efficiency of the rotating electric device (12), respectively.

According to the construction, as the power needed to generate electricity or power consumed by the driving source (1) can be reduced, it is possible to attempt to improve the fuel economy of a vehicle.

According to the present invention, the electric power generation control means (7, 8) controls power supplied to an electric apparatus (9a, 9b) installed in a vehicle based on the generation based on the power generation efficiency of the generator (2) and the power generation efficiency of the rotating electric device (12).

According to the present invention, there is provided a power source supply means (8a) for preferentially supplying power generated by the rotating electric device (12) to the vehicle installed electric apparatus (9a, 9b).

According to the present invention, the generator (2) is an alternator for controlling power generation by controlling magnetic poles and the strength of a rotating field by controlling a field current.

According to the present invention, the rotating electric device (12) has a permanent magnet on a rotor.

The present invention may be more fully understood from the description of preferred embodiments of the invention, as set forth below, together with the accompanying drawings.

DESCRIPTION OF THE PREFERRED EMBODIMENTS (First Embodiment)

Figure 1:
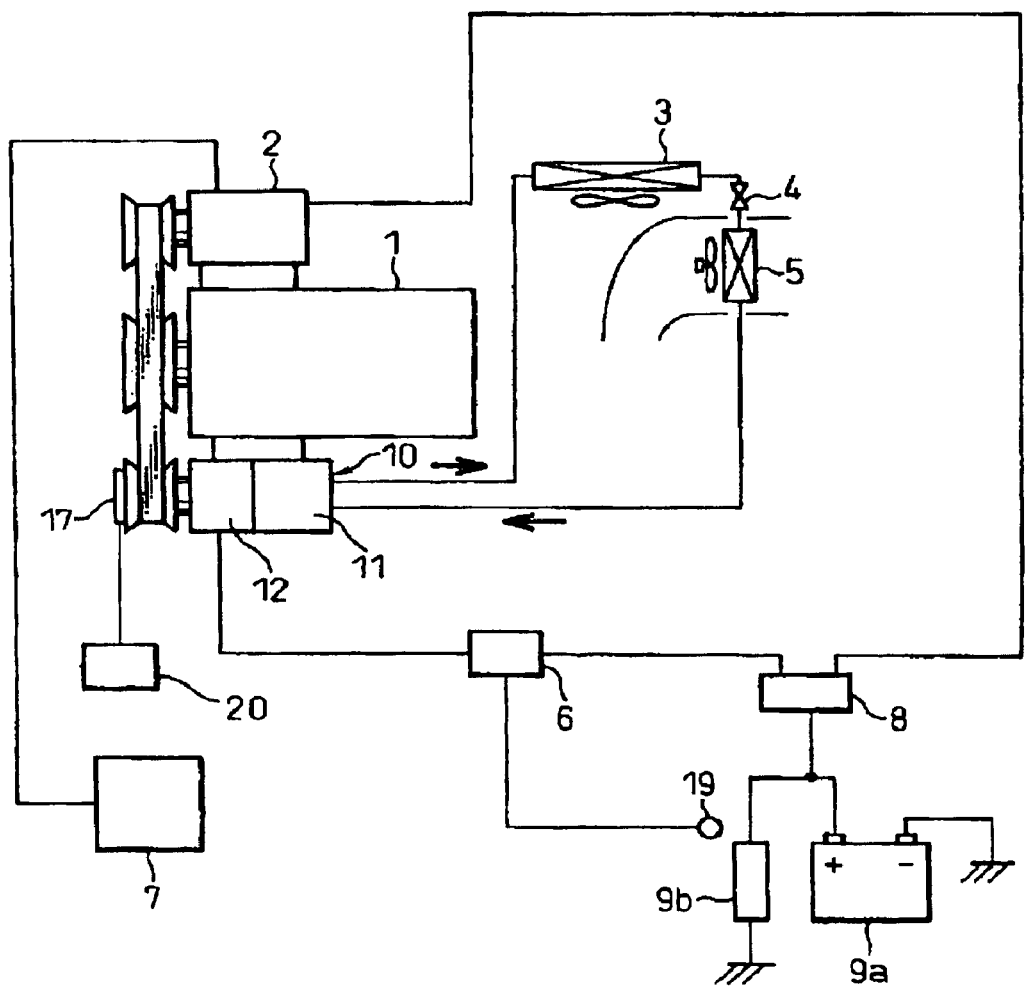
FIG. 1 is an exemplary diagram illustrating an automotive accessories control system according to a first embodiment of the present invention.
Figure 2:
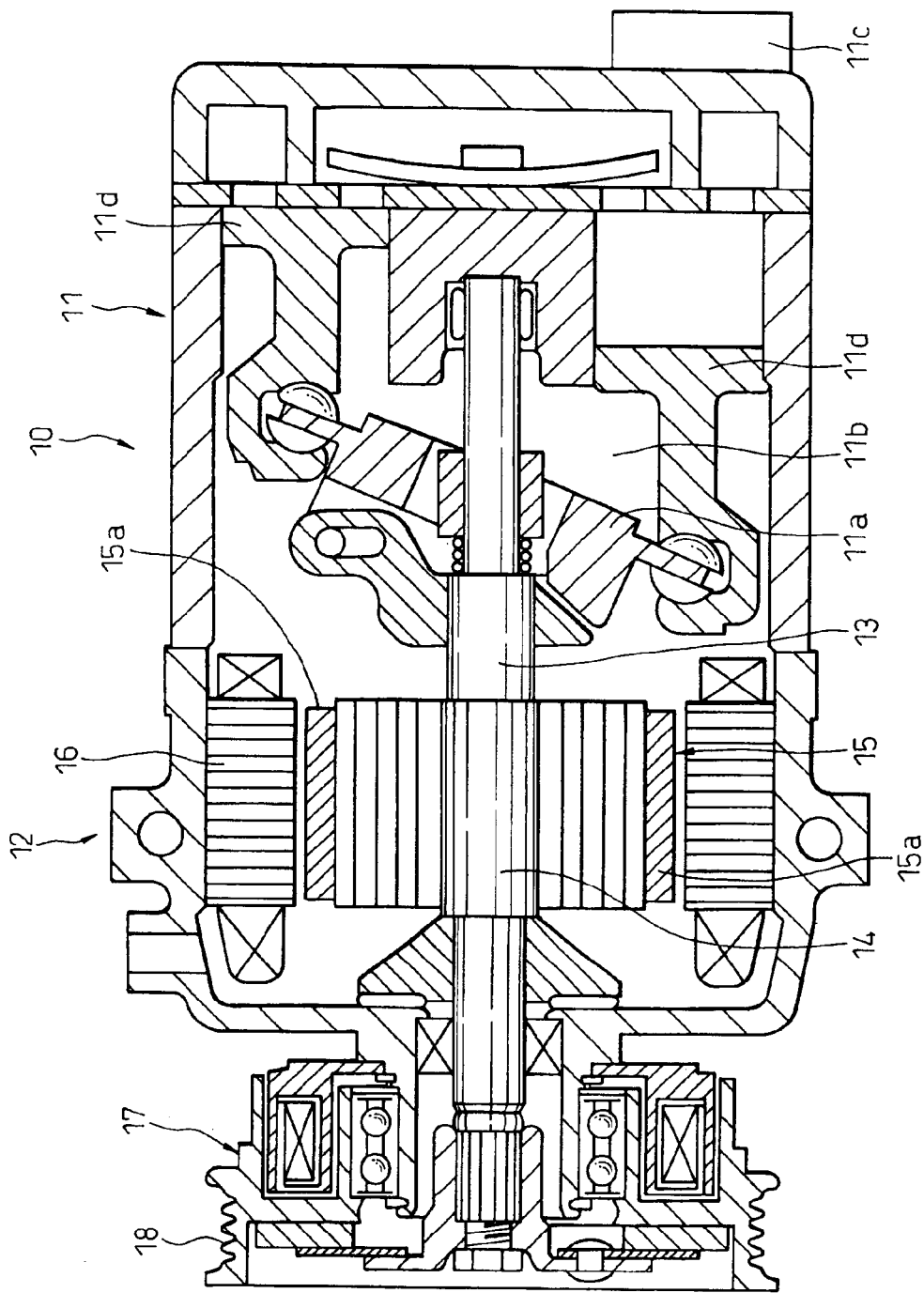
FIG. 2 is an exemplary diagram of a compressor having an integral electric motor according to the first embodiment of the present invention.

FIG. 1 is an exemplary diagram illustrating an automotive accessories control system according to an embodiment of the present invention, and FIG. 2 is an exemplary diagram of a compressor having an integral electric motor according to the embodiment.

In FIG. 1, an engine 1 is a driving source for running the vehicle, and an alternator 2 is a generator adapted to obtain power from the engine 1 so as to generate electricity. Note that the alternator is, as is known, able to control power generated by controlling magnetic poles of a rotor and the strength of a rotating field by controlling field current that is conducted to the rotor by a regulator.

A compressor 11 is able to obtain power from at least either the engine 1 or an electric motor 12 to draw in and compress a refrigerant and, in this embodiment, as shown in FIG. 2, a so-called hybrid compressor 10 is adopted in which the compressor 11 and the electric motor 12 are integrated into a single unit. Note that the details of the hybrid compressor 10 will he described later.

A condenser 3 is a heat dissipating apparatus for removing heat from a high-pressure refrigerant discharged from the compressor 11, a pressure reducer 4 is able to reduce the pressure of the refrigerant cooled by the condenser 3, and an evaporator 5 is able to generate a refrigeration capability by causing the refrigerant to vaporize. Note that in this embodiment, the condenser 3 cools the refrigerant through heat exchange between outside air and the refrigerant, and the evaporator 5 heats the refrigerant through heat exchange between air blown out into the passenger compartment and the refrigerant.

In addition, a motor controller 6 is able to control the operation of the electric motor 12, and a power generation controller 7 is able to control power generated by the alternator 2 and power generated by the electric motor 12 when the electric motor 12 is used to generate power.

Then, when the compressor 11 is driven by the electric motor 12, the motor controller 6 controls a voltage applied to the electric motor 12 to control the rotational speed thereof, whereas, when power is generated by the electric motor 12, the motor controller 6 controls power generated by the electric motor 12 based on a control signal from the power generation controller 7.

A power supply changeover device 8 is able to change over power supplies to an on-board battery 9a and an electric apparatus 9b, such as an electric motor for a blower, which is different from the electric motor 12, in a case where power generated by the alternator 2 is supplied, a case where power generated by the electric motor 12 is supplied and a case where power generated by the alternator 2 and the electric motor 12 is supplied.

Note that, in a case where power generated by the alternator 2 and power generated by the electric motor 12 are supplied to the on-board battery 9a and the electric apparatus 9b, a supply ratio between power generated by the alternator 2 and power generated by the electric motor 12 is controlled by the power generation controller 7.

Incidentally, the control of the power supply ratio will be implemented as described below.

Firstly, (1) a load current is detected by an electric current sensor 19 shown in FIG. 1 to thereby detect the power needed by the electric load 9b. Next, (2) power generation efficiencies of the alternator 2 and the hybrid compressor 10 are determined based on efficiency maps represented by the operating rotational speed of the engine of the respective power generating devices. Following this, (3) in the event that the power generation efficiency of the hybrid compressor 10 is higher, priority is given to power generation by the hybrid compressor 10, and the amount of power generated is regulated by controlling the torque of the motor (generator) by the motor controller 6 so as to meet the needed power (the alternator 2 is controlled so as not to generate power by restricting field current). Here, even if the amount of power generated by the hybrid compressor 10 is regulated, if there occurs a shortage of power required by the electric load 9b, the alternator 2 is controlled so as to compensate for the shortage of power by increasing the field current to the alternator 2. In addition, (4) in the event that the power generation efficiency of the alternator 2 is higher, the field current of the alternator is regulated (so as to be higher than (3)), so that the total generation of power is implemented by the alternator 2. As this occurs, the power generation by the hybrid generator 10 is restricted by reducing the torque of the motor (the generator) by the motor controller 6, whereby the supply ratio of power is controlled.

Next, the hybrid compressor 10 will be described based on FIG. 2.

In the hybrid compressor 10 according to the embodiment, a shaft 13 of the wobble plate-type variable capacity compressor 11 and a rotor shaft 14 of the electric motor 12 are made common so that a single shaft can be used for both the rotating devices, whereby the compressor 11 and the electric motor 12 are integrated into a single unit as the hybrid compressor 10.

Note that, as is already known, the wobble plate-type variable capacity compressor is a compressor in which the pressure in a wobble plate chamber 11b, in which a wobble plate 11a is accommodated, is controlled by a pressure control valve 11c so as to change the inclination angle of the wobble plate 11a to thereby change the stroke of a piston 11d so that a discharging capacity, that is, a theoretical discharge amount that is discharged when the shaft 13 completes a single rotation, can be changed.

In addition, the electric motor 12 is a DC brushless electric rotating device in which a permanent magnet 15a is disposed as a rotor 15 so that a rotating field is generated around the rotor 15 by, for example, inverter controlling electric current that is conducted to a stator coil 16 to thereby rotate the rotor 15, that is, the rotor shaft 14.

Then, a power transmission system, in which an electromagnetic clutch 17 for transmitting power from the engine 1 to the rotor shaft 14 intermittently as required and a pulley 18 for receiving power from the engine 1 are integrated into a single unit, is assembled to one of axial end portions of the rotor shaft 14 which is opposite to an axial end portion where the compressor 11 is provided.

In the construction that has been described heretofore, when the hybrid compressor 10 is operated only by the engine 1, the electromagnetic clutch 17 is engaged by a compressor controller 20 so as to put the shaft 13 in operation, and a current is applied to the stator coil 16 to such an extent that no power generating action is taken by the electric motor 12. On the contrary, when the hybrid compressor 10 is operated only by the electric motor 12, the stator coil 16 is energized with the transmission of power from the engine 1 being cut off by the electromagnetic clutch 17.

Note that when the hybrid compressor 10 is operated by both the engine 1 and the electric motor 12, the stator coil 16 is energized while the shaft 13 is put in operation by the compressor controller 20 by engaging the electromagnetic clutch 17.

In addition, in the event that power is generated only by the electric motor 12, the electromagnetic clutch 17 is engaged by the compressor controller 20 so as to rotate the rotor shaft 14 with the discharging capacity of the compressor 11 being decreased to a minimum capacity. Incidentally, in the event that power is generated by the electric motor 12 while the compressor 11 is put in operation, the rotor shaft 14 is rotated with the discharging capacity of the compressor 11 being increased to a higher capacity than the minimum capacity.

Next, the control of the operation, which is characteristic of the embodiment, and the advantage thereof, will be described below.

Figure 3:
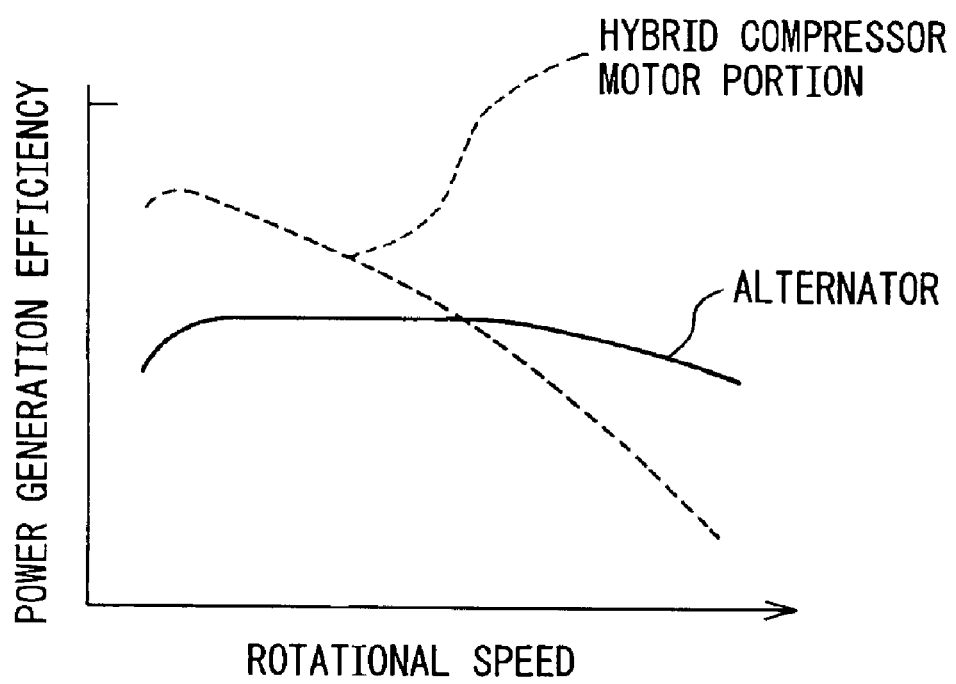
FIG. 3 is a graph illustrating a relationship between power generation efficiency and rotational speeds.

In this embodiment, in addition to the system of the alternator 2 as a rotating electric device and the system of the electric motor 12 as a rotating electric device being different from each other, the alternator 2 is a rotating electric device that is designed exclusively as a generator, the electric motor 12 is a rotating electric device that is designed to drive the compressor 11, and the power generation efficiency of the alternator 2 and the power generation efficiency of the electric motor 12 differ largely as shown in FIG. 3.

Consequently, according to the embodiment, power generated by the alternator 2 and power generated by the electric motor 12 are controlled based on power generation efficiencies of both the rotating electric devices which vary according to the rotational speed of the engine, that is, with the alternator 2, the rotational speed of a rotor of the alternator 2, and with the electric motor 12, the rotational speed of the rotor 15, and the power supplied the on-board battery 9a and the electric apparatus 9b is also so controlled.

Namely, the power generated by the alternator 2 and the power generated by the electric motor 12 are controlled such that the power generation amount of the device having a higher power generation efficiency becomes larger than the power generation amount of the device having a lower power generation efficiency, and such that power generated by the device having the higher power generation efficiency is supplied more to the on-board battery 9a and the electric apparatus 9b.

As a specific selecting method, a power generation efficiency map such as shown in FIG. 3 is stored in the power generation controller 7, so that which power generation amount to be selected is determined according to the data stored in the map and the rotational speed of the engine, as well as a required power generation amount.

Consequently, power needed for power generation, that is, power consumed by the engine 1 can be reduced, thereby making it possible to improve the fuel economy of the vehicle.

Note that in this embodiment, as the DC brushless motor having the magnet rotor is adopted as the electric motor 12 for driving the compressor, while a high electromotive force can be obtained compared with an electromotive force that can be obtained using the alternator 2, the higher the rotation speed increases, the more power is needed to rotate the magnet rotor, and the power generation efficiency decreases.

On the other hand, in the alternator 2, as nothing having a large mass such as a magnet (a permanent magnet) is disposed on the rotor, a variation in the power generation efficiency of the alternator 2 is smaller than that of the electric motor 12.

(Second Embodiment)

Figure 4:
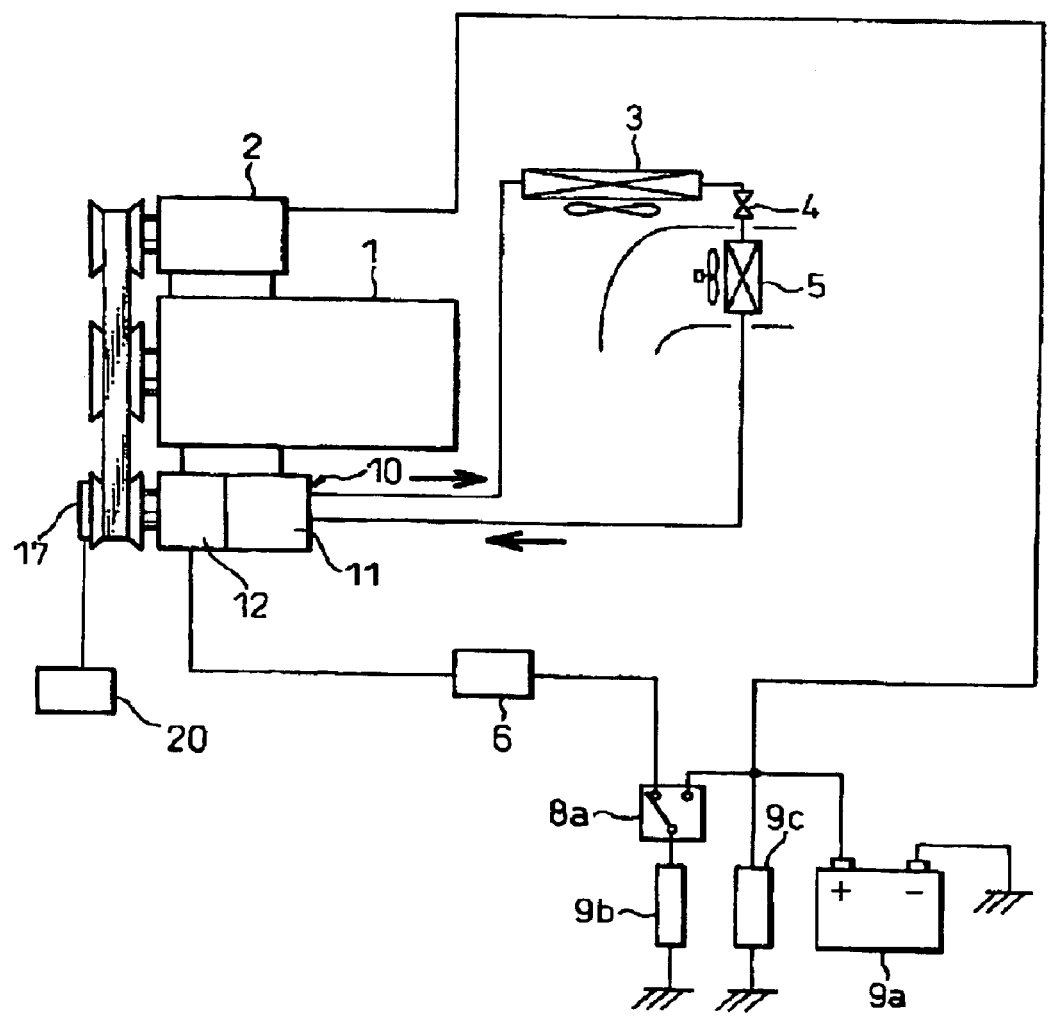
FIG. 4 is an exemplary diagram illustrating an automotive accessories control system according to a second embodiment of the present invention.

In this embodiment, as shown in FIG. 4, there is provided a power source supply device 8a for preferentially supplying power generated by the electric motor 12 to an electric apparatus 9b for an air conditioner such as an electric motor for a blower in electric apparatuses 9a to 9c which are installed in the vehicle.

While, in the first and second embodiments, the alternator is adopted as the generator, the present invention is not limited thereto, and a DC generator may also be used.

In addition, while, in the first and second embodiments, the DC brushless motor is adopted as the electric motor 12, the present invention is not limited thereto, and, for example, an inductor-type rotating electric device may also be used.

Additionally, while, in the first and second embodiments, the power supply changeover device 8 is used only to change over the flows of current, the present invention is not limited thereto, and a power distribution may be controlled by the power source supply device 8.

In addition, the electromagnetic clutch 17 may be removed to thereby leave the pulley 18 only.

While the invention has been described by reference to the specific embodiments chosen for purposes of illustration, it should be apparent that numerous modifications could be made thereto, by those skilled in the art, without departing from the basic concept and scope of the invention.

What is claimed is:

1. An automotive accessories control system for an automotive vehicle having a compressor, which is adapted to obtain power from one of a driving source for powering the vehicle and a rotating electric device to draw in and compress a refrigerant, and a generator, which is adapted to obtain power from the driving source to generate electricity, the automotive accessories control system comprising:
   compressor control means for controlling power supplied to the compressor from at least the driving source or the rotating electric device; and
   electric power generation control means for controlling power generated by the generator and power generated by the rotating electric device when electricity is generated by driving the rotating electric device by the driving source, wherein the electric power generation control means controls power generated by the generator and the rotating electric device based on the power generation efficiency of the generator and the power generation efficiency of the rotating electric device, which vary according to the rotational speed of the driving source for powering the vehicle, respectively.

2. An automotive accessories control system as set forth in claim 1, wherein the electric power generation control means controls power supplied to an electric apparatus installed in a vehicle based on the power generation efficiency of the generator and the power generation efficiency of the rotating electric device.

3. An automotive accessories control system as set forth in claim 1, wherein there is provided a power source supply means for preferentially supplying power generated by the rotating electric device to the electric apparatus installed in the vehicle.

4. An automotive accessories control system as set forth in claim 1, wherein the generator is an alternator for controlling power generated by controlling magnetic poles and the strength of a rotating field by controlling a field current.

5. An automotive accessories control system as set forth in claim 1, wherein the rotating electric device has a permanent magnet on a rotor.

6. An automotive accessories control system as set forth in claim 1, wherein the compressor and the rotating electric device are connected to be driven by a rotor shaft, wherein the compressor is a variable capacity-type compressor, and wherein, in the event that the power generation efficiency of the compressor is higher than the power generation efficiency of the rotating electric device, the rotating electric device is rotation ally driven by the driving source for power generation with the capacity of the compressor being made a minimum.

7. An automotive accessories control system for an automotive vehicle including: a compressor, which is adapted to obtain power from one of a driving source for powering the vehicle; a rotating electric device to draw in and compress a refrigerant; and a generator, which is powered by the driving source to generate electricity, the automotive accessories control system comprising:
   a compressor controller for controlling power supplied to the compressor from the driving source or the rotating electric device; and
   an electric power generation controller for controlling power generated by the generator and power generated by the rotating electric device, when electricity is generated, by driving the rotating electric device with the driving source, wherein the electric power generation control means controls power generated by the generator and the rotating electric device based on the power generation efficiency of the generator and the power generation efficiency of the rotating electric device, which vary according to the rotational speed of the driving source for powering the vehicle, so that the amount of power generated by most efficient of the generator and the rotating electric device is greater than the amount of power generated by the least efficient of the generator and the rotating electric device.

8. An automotive accessories control system as set forth in claim 7, wherein the electric power generation controller controls power supplied to an electric apparatus installed in a vehicle based on the power generation efficiency of the generator and the power generation efficiency of the rotating electric device.

9. An automotive accessories control system as set forth in claim 7, wherein there is provided a power source supply means for preferentially supplying power generated by the rotating electric device to the electric apparatus installed in the vehicle.

10. An automotive accessories control system as set forth in claim 7, wherein the generator is an alternator for controlling power generated by controlling magnetic poles and the strength of a rotating field by controlling a field current.

11. An automotive accessories control system as set forth in claim 7, wherein the rotating electric device has a permanent magnet on a rotor.

12. An automotive accessories control system as set forth in claim 7, wherein the compressor and the rotating electric device are connected to be driven by a rotor shaft, and the compressor is a variable capacity-type compressor, and, in the event that the power generation efficiency of the compressor is higher than the power generation efficiency of the rotating electric device, the rotating electric device is rotationally driven by the driving source for power generation and the capacity of the compressor is minimized.

* * * * *